Feb. 6, 1951 T. ROTTER 2,540,549
METHOD OF FORMING LAMINATED ARTICLES
Filed April 22, 1948 2 Sheets-Sheet 1

Theodore Rotter
INVENTOR.

BY *Clarence A. O'Brien*
*and Harvey B. Jackson*
Attorneys

Feb. 6, 1951     T. ROTTER     2,540,549
METHOD OF FORMING LAMINATED ARTICLES
Filed April 22, 1948     2 Sheets-Sheet 2
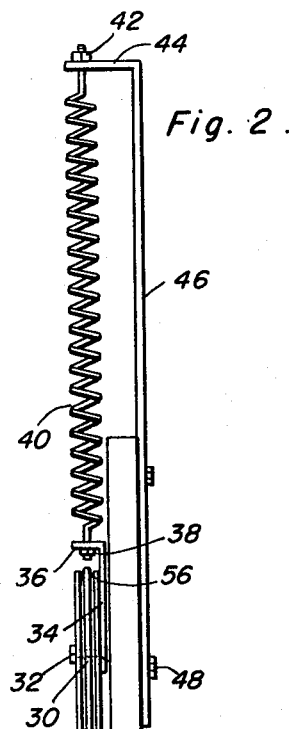
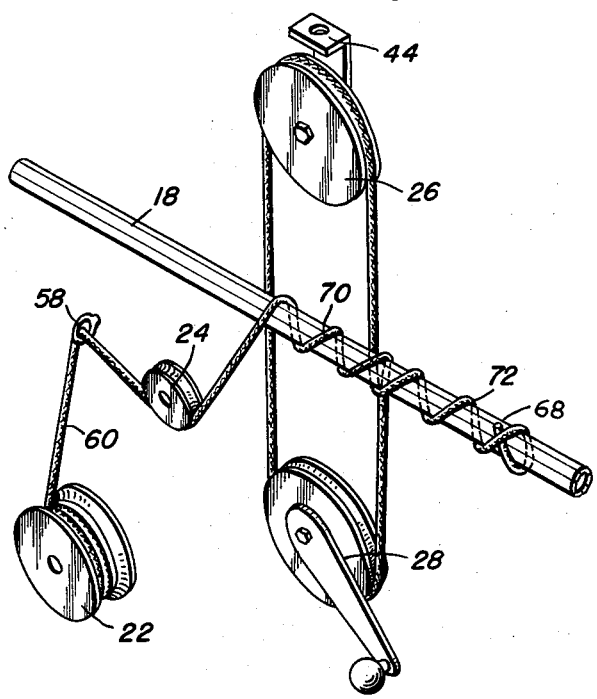
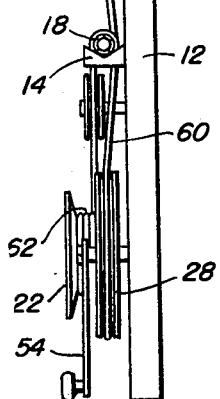
Theodore Rotter
INVENTOR.

Patented Feb. 6, 1951

2,540,549

UNITED STATES PATENT OFFICE 2,540,549

METHOD OF FORMING LAMINATED ARTICLES

Theodore Rotter, Denver, Colo.

Application April 22, 1948, Serial No. 22,671

5 Claims. (Cl. 154—117)

This invention relates to the formation of fishing rods from bamboo strips and a primary object of the invention is to supply equal pressure along the entire length of the strips that are glued together, whereby the finished product will be absolutely straight and thereby avoid the necessity for subsequently heating the glued rods in order to correct for the portions along the length of the rod that may have been bent due to the uneven pressure applied at various points, thereof.

Another object of the invention is to provide a pressure medium at one portion of the length of the bamboo strips to align and straighten the rods while at the same time applying the necessary pressure to the glued strips to hold them together in rigid and non-slip relation while drying.

And another object of the invention is the avoidance of contact for the bamboo sections with metals or other objects that are detrimental and injurious to the bamboo during the process of gluing and drying.

A further object of the invention is to adjust the tension applied to the fishing rod strips to rapidly obtain the necessary uniform pressure and retain such strips under that pressure until the finished product is secured.

And a further object of the invention is to provide means whereby the bamboo strips are retained in horizontal position at all times for longitudinal travel and yet are free to rotate while compression is taking place.

The invention accordingly comprises the features of the construction, combination of elements and arrangement of parts, which are exemplified in the description hereinafter in connection with the accompanying drawings and in the scope of the application of which will be indicated in the following claims. In the accompanying drawings, in which is illustrated one of various possible embodiments of the invention, Figure 1 is a front elevation of the gluing apparatus;

Figure 2 is a side elevation of the device shown in Figure 1;

Figure 3 is a perspective view of the wrapping means of the invention;

Figure 4 is a transverse vertical sectional view taken substantially on the lines 4—4 of Figure 1, and;

Figure 1:
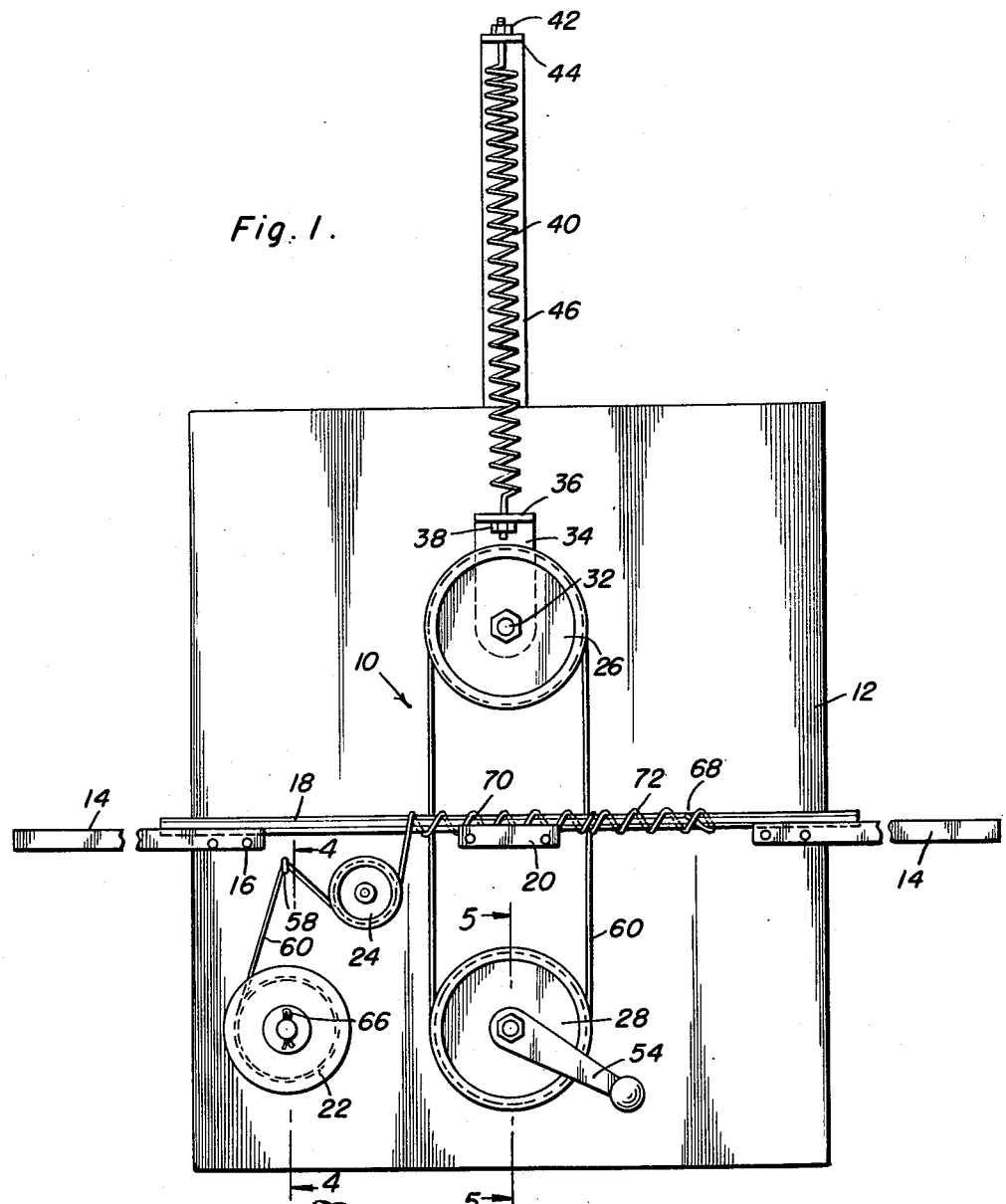
Figure 5:
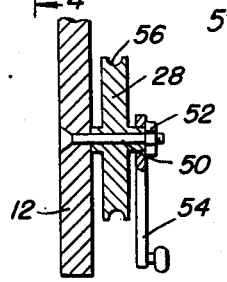
Figure 5 is a transverse vertical sectional view taken substantially along the line 5—5 of Figure 1.

In the process of joining bamboo strips to form a finished fishing rod, it is customary to glue the strips, of which there are generally six, together and hold such glued strips under extreme compression in order to retain them together until dry. Much difficulty has been encountered in the compression step since it is extremely difficult to assure uniform pressure at each point along the length of the fishing rod. As a result, the finished product frequently is bent or crooked and it becomes necessary to heat the section in order to straighten it before it can be used to make up a fishing rod. In order to overcome such difficulties it is the purpose of the instant invention to provide means whereby uniform pressure is supplied in a manner that will assure a finished product that is in perfect axial alignment.

Referring to the figures, the gluing machine of the invention is indicated generally by the numeral 10 and is mounted on a suitable board 12 for the operation thereof. The board 12 has mounted thereon a pair of spaced sectional supporting arms 14 by means of suitable bolts or rivets 16. The supporting arms 14 are substantially V-shape in construction and are adapted to retain within the groove formed by the V, for longitudinal movement along the length thereof, a fishing rod section 18 of bamboo strips, of which there are six in number. (See Figure 3.) The ends of these bamboo strips are glued together and the machine of the invention is designed to retain these strips together under suitable tension while the drying takes place. A suitable carrier block 20, cut in a V angle of about 90° is mounted on board 12 along the intermediate path of travel of the fishing rod section 18 in order to insure proper alignment thereof while permitting friction free rotation of the rod.

The gluing machine consists of a thread carrying spool 22, a tension roller 24, and traction means consisting of driven pulley 26 and drive pulley 28. Driven pulley 26 is retained on board pulley 28 along the upper axial length thereof by means of shaft 30 headed at 32. Shaft 30 extends through the depending legs 34 of a relatively short angle bracket member, transverse legs 36 thereof retaining therein as by suitable bolt means 38 a tension spring 40. Tension spring 40 is secured at the outer free ends thereof as by similar bolt means 42 to the lateral leg 44 of an elongated angle bracket member similar to the one retained by pulley 26. The depending leg 46 is mounted on the rear surface of board 12 by bolt members 48. Angle brackets 44, 46 are adapted to be adjusted in order to vary the tension of spring 40. Pulley 28 is mounted on board 12 by transverse pin 50 retained in position by bolts 52 and include an actuating handle or crank 54. It is to be noted that pulleys 26 and 28 are in direct vertical alignment. Pulleys 26 and 28 are grooved at 56, as is usual.

Positioned between spool 22 and tension roller 24 on board 12 is an eye bolt 58 through which a suitable string 60 is passed in order to assist in proper tensioning of the string, as will presently appear. Spool 22 includes a U-shaped groove 62 within which the thread 60 is wound and spool 22 is also retained for rotation by means of transverse shaft or pin 64 secured in spaced relation on board 12 and is retained in position by a suitable cotter pin 66.

In the operation of the device, string 60 is of one continuous piece and is passed through eye bolt 58 and under tension roller 24 and then wound around fishing rod section 18 for several turns thereof, after which string 60 is continued around drive sheave 28 and over driven sheave 26 and then again around fishing rod section 18 in the same direction as the initial winding, terminating in a halfhitch at 68, as is clearly seen in Figures 1 and 3. Thus, it is to be noted that while string 60 is of one continuous strip through the end 68, the windings are actually of two different groups 70 and 72, winding 70 acting as the pressure aligning and straightening tension while group 72 is the actual pressure winding means. When this has been done, and handle 54 is rotated, pulley 28 then rotates through drive pulley 26 and rod 18 rotates through the winding 70, while winding 72 forms the compression means.

Thus, it is readily apparent that the portion of the string 60 forming wrapping 70 and travelling around the pulley 28 and the portion of the string leaving pulley 26 and forming wrapping 72 pull in opposite directions and create a tremendous compressing action at their junction without any distortion. In order to assure such compression without distortion so that the dried fishing rod section 18 is absolutely straight, roller 24 is adjusted to provide more resistance for string 60. Distortion would occur to the left of the section by such adjustment and if more resistance were applied to pulley 26 by means of spring 40, distortion would occur to the right of rod 18. Therefore, by properly adjusting such tension means, distortion is completely eliminated and the final product is obtained in absolute axial alignment. It is to be noted that rod 18 rides at all times on wrappings or string 60 in the carrier block means 16 and 20 without touching the sides thereof and thereby eliminating any injury to the bamboo strips. In the event that members 16 are sufficient to rotatably support rod 18, it may be expedient to eliminate carrier block 20. The particular construction of the aligning means permits ready rotation of the rod. It is obvious, that fishing rod 18 may be made in individual, small segments or may be constructed of a single elongated member.

It is of course to be understood that the details of structure and arrangement of parts may be variously changed and modified without departing from the spirit and scope of the invention.

Having described the invention, what is claimed as new is:

1. The method of forming a fishing rod comprising the steps of assembling a plurality of strips in a predetermined formation applying adhesive to an adjoining portion of each of said strips, retaining said strips in said assembled formation and while so retaining the strips wrapping a flexible member around the strips, reversing the wrapping of the member around the strips and pulling the member to compress the strips in proper alignment until the adhesive is set.

2. The method of forming a fishing rod comprising the steps of assembling a plurality of strips in side by side relation, applying an adhesive to adjoining portions of each of said strips, retaining said strips in said formation, and while so retaining the strips, wrapping a flexible member around the strips, reversing the wrapping of the member around the strips, and pulling the member to compress the strips until the adhesive is set.

3. The method of forming a fishing rod comprising the steps of assembling a plurality of strips in side by side relation, applying an adhesive to adjoining portions of said strips retaining said strips in said formation, and while so retaining the strips, wrapping a flexible member around the strips, reversing the wrapping of the member around the strips, pulling the member to rotate the rod and tighten the member to compress the strips until the adhesive is set.

4. The method of forming a fishing rod comprising the steps of applying adhesive to a plurality of strips, assembling said strips in side by side relation, retaining said strips in said formation, and while so retaining said strips, wrapping a flexible member around the strips, reversing the wrapping of the member around the strips, and tightening the member to compress the strips until the adhesive is set.

5. The method of forming a fishing rod comprising the steps of assembling a plurality of strips in side by side relation, retaining said strips in said formation, applying adhesive to adjoining portions of said strips, and while so retaining said strips, wrapping a flexible member around the strips, continuing wrapping of the member in a reverse manner, rotating the strips, to pull the member in opposite directions to compress the strips and adjusting the tension on the member to avoid distortion of the strips while the adhesive is setting.

THEODORE ROTTER.

REFERENCES CITED

The following references are of record in the file of this patent:

UNITED STATES PATENTS

| Number | Name | Date |
|---|---|---|
| 1,274,144 | Dale | July 30, 1918 |
| 1,526,572 | Ten Eyck | Feb. 17, 1925 |
| 1,602,635 | Baldwin et al. | Oct. 12, 1926 |
| 1,680,358 | Baldwin et al. | Aug. 14, 1928 |
| 2,061,286 | Millett | Nov. 17, 1936 |
| 2,296,781 | Farny | Sept. 22, 1942 |
| 2,335,191 | Minich | Nov. 23, 1943 |
| 2,390,039 | Slayter et al. | Nov. 27, 1945 |
| 2,446,292 | McConnell et al. | Aug. 3, 1948 |